US010271222B2

(12) United States Patent
Gao et al.

(10) Patent No.: US 10,271,222 B2
(45) Date of Patent: Apr. 23, 2019

(54) OMNI-DIRECTIONAL TRANSMISSION IN LARGE-SCALE MIMO SYSTEMS

(71) Applicant: Southeast University, Nanjing (CN)

(72) Inventors: Xiqi Gao, Nanjing (CN); Xin Meng, Nanjing (CN); Wen Zhong, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 0 days.

(21) Appl. No.: 15/506,750

(22) PCT Filed: Aug. 28, 2014

(86) PCT No.: PCT/CN2014/085359
§ 371 (c)(1),
(2) Date: Feb. 27, 2017

(87) PCT Pub. No.: WO2016/029394
PCT Pub. Date: Mar. 3, 2016

(65) Prior Publication Data
US 2018/0115912 A1      Apr. 26, 2018

(51) Int. Cl.
*H04B 7/06*       (2006.01)
*H04W 16/28*   (2009.01)
(Continued)

(52) U.S. Cl.
CPC .......... *H04W 16/28* (2013.01); *H04B 7/0408* (2013.01); *H04B 7/0413* (2013.01);
(Continued)

(58) Field of Classification Search
CPC ... H04B 7/0413; H04B 7/0452; H04B 7/0456
(Continued)

(56) References Cited

U.S. PATENT DOCUMENTS 9,001,924 B1 *  4/2015  Wu ...................... H04B 7/0413
                                                                          375/295
9,258,161 B2    2/2016  Jalloul et al.
(Continued)

FOREIGN PATENT DOCUMENTS

| CN | 103546264 A | 1/2014 |
| CN | 103560985 A | 2/2014 |
| CN | 103929382 A | 7/2014 |

OTHER PUBLICATIONS

International Search Report for PCT/CN2014/085359 dated Jun. 3, 2015, 3 pages.
Written Opinion of the International Search Authority for PCT/CN2014/085359 dated Jun. 3, 2015, 4pages.

*Primary Examiner* — Kevin Kim
(74) *Attorney, Agent, or Firm* — Metis IP LLC

(57) ABSTRACT

Described herein is an omni-directional transmission scheme allowing signals to transmit from a base station to multiple users in massive MIMO systems with reduced pilot overhead and system complexity. The transmission scheme uses a low-dimensional space-time coding scheme to generate a K-dimensional vector signal, and based on the K-dimensional vector signal, using an omni-directional precoding matrix W to generate an M-dimensional vector signal for transmission over a large number of transmitting antennas, wherein the matrix W comprises M rows and K columns, and K is much smaller than M.

19 Claims, 5 Drawing Sheets

(51) Int. Cl.
*H04L 1/00* (2006.01)
*H04B 7/0413* (2017.01)
*H04L 1/06* (2006.01)
*H04B 7/0408* (2017.01)
*H04B 7/0456* (2017.01)
*H04L 25/03* (2006.01)
*H04B 7/0452* (2017.01)

(52) U.S. Cl.
CPC ......... *H04B 7/0456* (2013.01); *H04B 7/0617* (2013.01); *H04B 7/0669* (2013.01); *H04L 1/00* (2013.01); *H04L 1/0668* (2013.01); *H04L 25/03898* (2013.01); *H04B 7/0452* (2013.01); *H04B 7/0465* (2013.01); *H04L 1/0042* (2013.01)

(58) Field of Classification Search
USPC .................................................. 375/267, 299
See application file for complete search history.

(56) References Cited

U.S. PATENT DOCUMENTS

| | | | | |
|---|---|---|---|---|
| 2008/0102881 A1* | 5/2008 | Han | ................ | H01Q 3/30 455/522 |
| 2010/0208837 A1* | 8/2010 | Vetter | ................ | H04B 7/0452 375/267 |
| 2011/0255571 A1* | 10/2011 | Caffrey | ................ | H04B 1/707 375/141 |

\* cited by examiner

OMNI-DIRECTIONAL TRANSMISSION IN LARGE-SCALE MIMO SYSTEMS

CROSS-REFERENCE TO RELATED APPLICATIONS

This present application is a U.S. national stage under 35 U.S.C. § 371 of International Application No. PCT/CN2014/085359, filed on Aug. 28, 2014, designating the United States of America, the contents of which are incorporated herein by reference.

FIELD OF THE INVENTION

The present invention relates generally to mobile communication systems using a large array of antennas, and more particularly, to an omni-directional transmission scheme that reduces overhead and enhances system efficiency in downlink transmissions in large scale MIMO (Multiple Input Multiple Output) systems.

BACKGROUND

An emerging research area in multi-user MIMO communications is so-called massive MIMO or large-scale MIMO systems. Unlike conventional multi-user MIMO systems that employ less than ten antennas at the base station, a base station in a massive MIMO system is typically equipped with much larger number of antennas, e.g., 64 or more, and serving dozens of users or mobile terminals (e.g., 40) simultaneously.

Compared with conventional MIMO systems, large scale MIMO systems have many benefits. For example, with more antennas employed, each antenna unit can be made smaller and at a lower cost. Also, since a larger number of antenna units can provide more spatial freedom, the base station in any given cell can use the same time and frequency resources to communicate with multiple users simultaneously, which can significantly improve spectral efficiency. The system power efficiency can also be improved because massive antenna units allow for a better spatial orientation between the base station and each user or mobile terminal in the cell for downlink and/or uplink transmissions, which can significantly reduce the transmission power from both the base station and mobile terminal sides. In addition, when there exists a sufficient number of base station antennas, the random channels between each user and the base station can be nearly orthogonal to each other, which can help eliminate inter-cell and inter-user interferences and noises. For the above reasons, it is expected that large scale MIMO systems will be widely used.

Despite the above-mentioned technological advantages, however, current applications of massive MIMO may be constrained by existing transmission schemes. For example, in a cellular system, a public channel is often used to carry important signals from the base station to users, such as synchronization signals, reference signals within the cell, control signals, multimedia broadcast multicast service (MBMS) signals, and the like. Generally speaking, the transmission scheme for the public channel requires an omni-directional and reliable transmission to ensure cell-wide coverage. However, most existing transmission schemes, such as single antenna transmission, cyclic delay diversity (CDD) or space-time block codes (STBC), may be incompatible with a massive MIMO system. For example, under the single-antenna transmission scheme, a single antenna is chosen from the transmitting antennas in the base station for broadcasting signals. In that case, the chosen antenna is equipped with a much more powerful and expensive power amplifier to ensure the same area of coverage as all antennas are used for broadcasting signals. Nonetheless, this scheme would not work in a massive MIMO system because, by using a large number of antennas, each antenna is made small with a much less powerful amplifier for power reduction reasons, and no antenna would be sufficiently powerful to serve as the single antenna mentioned above. Similarly, many other transmission schemes, including the space-time block coding (STBC) and cyclic delay diversity (CDD) schemes widely used in the LTE systems, may not be applicable in massive MIMO systems. The increase in the number of antennas in a massive MIMO system can cause design challenges such as significantly increased pilot overhead.

Therefore, a need exists for a transmission scheme that can provide omni-directional coverage in massive MIMO systems without causing additional pilot overhead or compromising system efficiency.

SUMMARY OF THE INVENTION

The presently disclosed embodiments are directed to solving issues relating to one or more of the problems presented in the prior art, as well as providing additional features that will become readily apparent by reference to the following detailed description when taken in conjunction with the accompanying drawings.

The present invention provides an omni-directional transmission method suitable for massive MIMO system, with low expense of pilot overhead and low complexity of system implementation, so that the signals transmitted from the base station have the same signal powers in any spatial direction, thereby ensuring a full coverage of the cell; the transmitting signals from all antenna units equipped in the base station can have the same signal powers, thereby maximizing the power efficiency of each radio frequency unit and massive arrays of antennas; further, the degree of diversity can be as much as that of a low-dimensional space-time coding scheme employed.

The illustrative embodiment of the present invention comprises: generating one or more K-dimensional vector signals, said K-dimensional vector signals including at least a K-dimensional data signal and a K-dimensional pilot signal, wherein said K-dimensional data signal is generated by using a space-time coding scheme; applying an omni-directional pre-coding matrix to said K-dimensional signals to generate one or more M-dimensional signals, wherein K is much smaller than M; and transmitting said M-dimensional signals over M transmitting antennas in a base station of said large scale MIMO system.

In one embodiment, the precoding matrix used in the transmission scheme has the following characteristics: all M rows of said precoding matrix have the same 2-norm, all K columns of said precoding matrix have the same 2-norm and are orthogonal to each other, and if left-multiplying the precoding matrix by an matrix constructed from the array manifold in discrete spatial directions (e.g. an M-point DFT matrix for the uniform linear antenna array) to generate a different matrix, all rows of said different matrix have the same 2-norm.

Further features and advantages of the present disclosure, as well as the structure and operation of various embodiments of the present disclosure, are described in detail below with reference to the accompanying drawings.

BRIEF DESCRIPTION OF THE DRAWINGS

The present disclosure, in accordance with one or more various embodiments, is described in detail with reference to the following figures. The drawings are provided for purposes of illustration only and merely depict exemplary embodiments of the disclosure. These drawings are provided to facilitate the reader's understanding of the disclosure and should not limit the breadth, scope, or applicability of the disclosure. It should be noted that for clarity and ease of illustration these drawings are not necessarily made to scale.

DETAILED DESCRIPTION OF EXEMPLARY EMBODIMENTS

Figure 1:
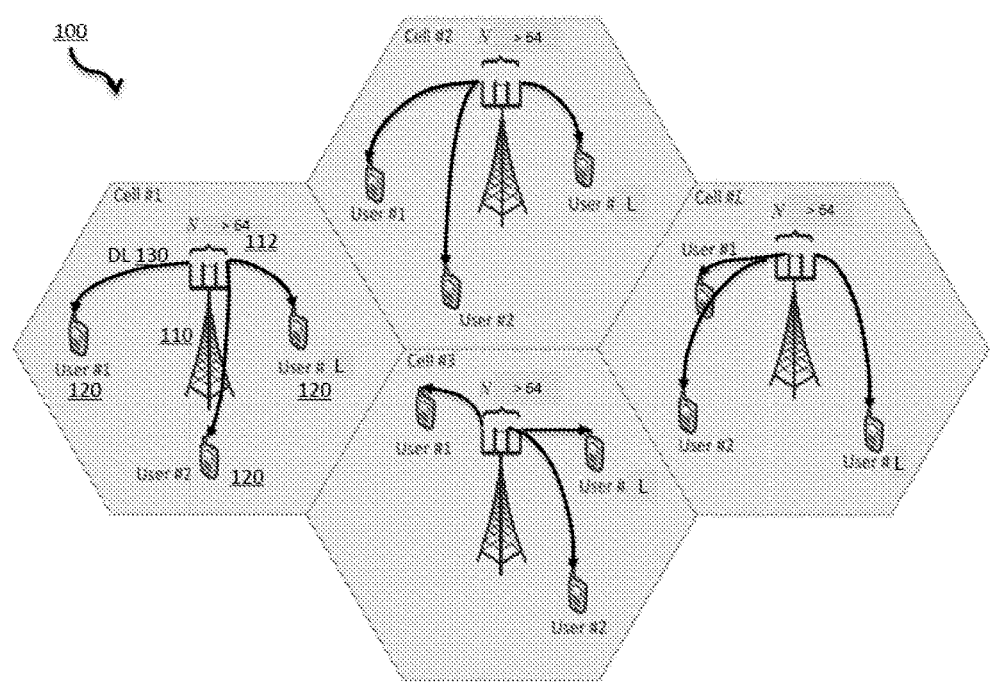
FIG. 1 is a schematic diagram depicting an exemplary multi-cell massive MIMO system in which embodiments of the invention can be implemented.

The following description is presented to enable a person of ordinary skill in the art to make use of the invention. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the invention. Thus, embodiments of the present invention are not intended to be limited to the examples described herein and shown, but are to be accorded the scope consistent with the claims.

The word "exemplary" is used herein to mean "serving as an example or illustration." Any aspect or design described herein as "exemplary" is not necessarily to be construed as preferred or advantageous over other aspects or designs.

Reference will now be made in detail to aspects of the subject technology, examples of which are illustrated in the accompanying drawings, wherein like reference numerals refer to like elements throughout.

It should be understood that the specific order or hierarchy of steps in the processes disclosed herein is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Embodiments disclosed herein are directed to an omni-directional downlink transmission scheme in massive MIMO systems. Without limiting the generality of the inventive embodiments, the transmission scheme described herein allows the system to have the following characteristics in a given cell:

(1) The signals transmitted from the base station have the same signal powers in any spatial direction, thereby ensuring a spatially indiscriminate coverage of the cell.

(2) The transmitting signals from all antenna units equipped in the base station have the same transmission powers, thereby maximizing the power efficiency of each radio frequency unit and massive arrays of antennas.

(3) The degree of diversity can be as much as that of a low-dimensional space-time coding scheme used in the whole transmission scheme.

Specifically, in one embodiment, the transmission scheme uses a low-dimensional space-time coding scheme to generate a K-dimensional vector signal, and based on the K-dimensional vector signal, using an omni-directional precoding matrix W to generate an M-dimensional vector signal for transmission over M transmitting antennas, wherein the matrix W comprises M rows and K columns, and K may be much smaller than M.

In one embodiment, the precoding matrix W used in the transmission scheme has the following characteristics: all M rows of said precoding matrix W have the same 2-norm, all K columns of said precoding matrix W have the same 2-norm and are orthogonal to each other, and if left-multiplying W by an matrix constructed from the array manifold in discrete spatial directions (e.g. an M-point DFT matrix for the uniform linear antenna array) to generate a different matrix, all rows of said different matrix have the same 2-norm.

Referring to FIG. 1, illustrated therein is an exemplary multi-cell massive MIMO system 100, which comprises multiple cells, each cell including at least a base station and multiple users (also known as mobile terminals). As shown in cell #1, a base station 110 is configured to send signals via downlink transmission 130 to multiple users 120 (e.g., #1, #2 . . . #L). Typically, the base station 110 is equipped with a large number of antennas 112. For example, the number of antennas M can be 64, 128, 256 or even more, which allows each antenna to be made very small with inexpensive amplifiers and thus consumes less power.

Figure 2:
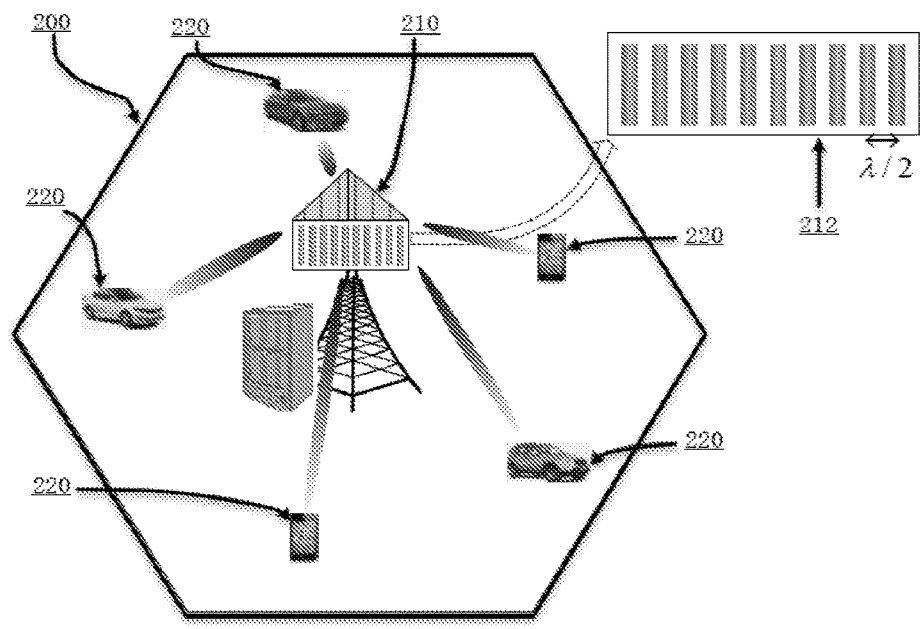
FIG. 2 is a schematic diagram depicting an exemplary single-cell massive MIMO system in which embodiments of the invention can be implemented.

FIG. 2 shows an exemplary single-cell massive MIMO system 200. In system 200, the base station 210 is configured with a large number of antennas to serve multiple users 220. As seen in FIG. 2, the large-scale array of antennas deployed on the base station may comprise several uniform linear antenna arrays, each array having a large number of antenna units 212. When each antenna unit is an omni-directional antenna or 120-degree sector antenna, the distance between the adjacent antenna units can be designated to be 0.5λ or λ/√3, where λ is the carrier wavelength. The large-scale array of antennas can also deploy a circular antenna array or other array structure that is easy to be installed. In one configuration, each antenna unit in the large-scale array of antennas is connected to the digital baseband signal processing unit via their respective radio frequency transceiver units, A/D or D/A conversion units, digital optical modules and optical transmission links.

Figure 3:
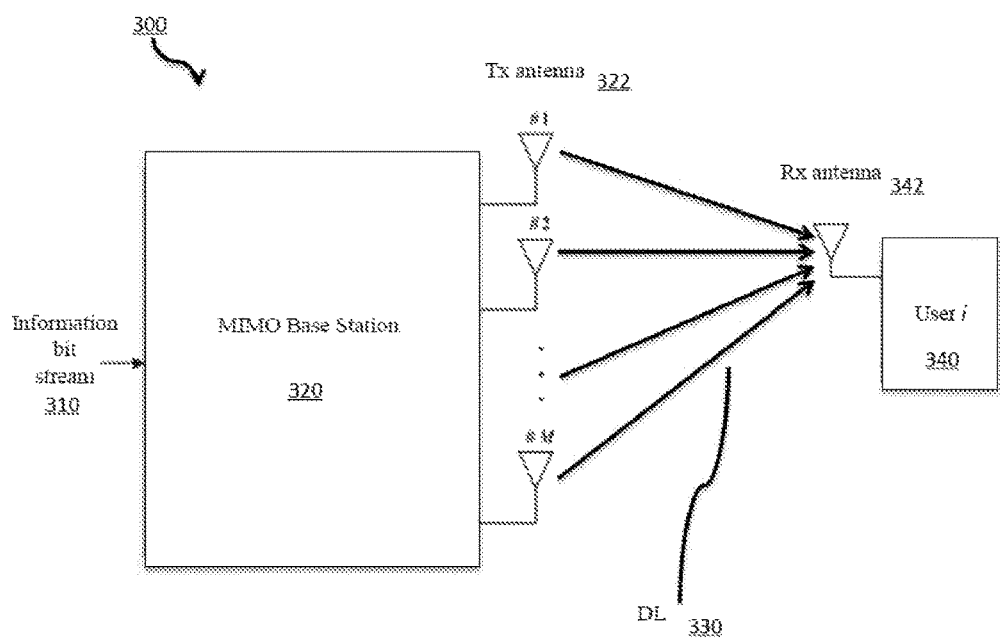
FIG. 3 is a block diagram showing an exemplary downlink transmission scenario between a massive MIMO base station and a representative user, in which embodiments of the invention can be implemented.

In a massive MIMO system, the base station sends massive amounts of data to multiple users via downlink transmissions, in support of which various transmission schemes may be implemented. For example, FIG. 3 presents one exemplary data transmission scenario 300 that enables downlink transmission from a MIMO base station 320 to multiple users 340 (represented by User i) in all directions. As seen in FIG. 3, the base station 320 is configured with M transmit antennas 322, e.g., Tx Antennas #1, #2, ... # M, where M can be over 64, for example, 128 or 256. Each user 340 (in the form of a mobile terminal) can be equipped with one or more receive antennas 342. For purposes of illustration only, each of the multiple users herein below is assumed to have a single receive antenna. But it should be understood that such assumption does not limit the application of the inventive embodiments in terms of how many antennas are configured in each user.

When information bit streams 310 are transmitted from the base station 320 to users 340, they are usually processed in the base station 320 to generate transmit signals. Eventually the transmit signals are transmitted by multiple transmitter units connected to multiple antenna units, such as the M number of antennas 322, via a downlink transmission 330 to users in accordance with a particular transmission scheme. The transmission paths or channels between the base station and users are illustrated in FIG. 4, as will be described in details below.

Figure 4:
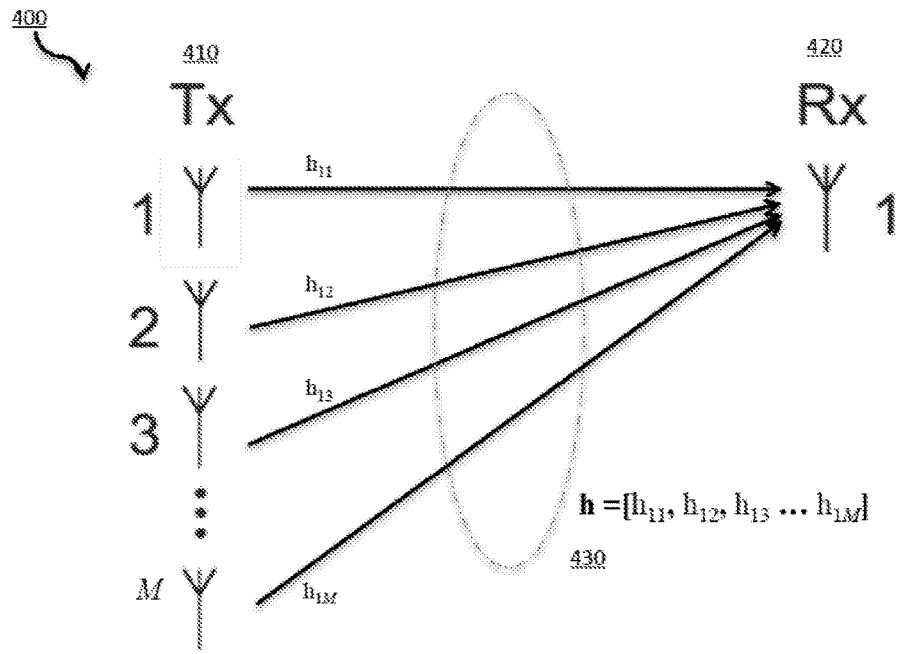
FIG. 4 is a diagram providing a simplified view of exemplary transmission paths or channels in the downlink transmission scenario of FIG. 3, in which embodiments of the invention can be implemented.

As shown in FIG. 4, on the transmitting side 410, there are M transmit antennas #1, #2, ..., #M. When signals are transmitted from the transmit antennas to the receive antenna 420, they travel through transmission paths or channels 430, which are represented as an M-dimensional channel vector $h=[h_{11}\ h_{12}\ \ldots\ h_{1M}]$. h provides important channel information for the receiving side to decode the received signal. Here a frequency flat fading channel is assumed for purposes of illustration only, which can be considered as a subcarrier channel in the OFDM transmission framework. The process of estimating channel information is often called channel estimation.

One popular approach for channel estimation to obtain channel state information (CSI), especially instantaneous CSI, is by using training sequence or pilot sequence, where a known signal is downlink transmitted from the base station to users, and the channel information is estimated using the combined knowledge of the transmitted and received signal. For example, when a known pilot vector sequence $S=[s_0\ s_1\ \ldots\ s_{J-1}]$ is transmitted over transmission channels or paths (denoted as h), the receiving signal y is denoted as $y=hS+z$, where z denotes noise vector. Based on this equation, h can be recovered from the knowledge of Y and S.

However, this approach above can be problematic in a massive MIMO system using a large-scale array of transmit antennas. For the purpose of channel estimation, the length of a pilot sequence J needs to be at least M, the number of transmit antennas. Thus when M increases to the level of hundreds, the pilot sequence becomes very long accordingly. As a result, a great amount of J stem resources have to be used for transmitting pilot sequences, which would cause unacceptable pilot overhead and system inefficiency. This problem can be solved by embodiments of the invention providing an omni-directional transmission scheme in a massive MIMO system, as will be described below with reference to FIGS. 5-6.

A. Omni-directional Transmission Scheme in a Massive MIMO System

Figure 5:
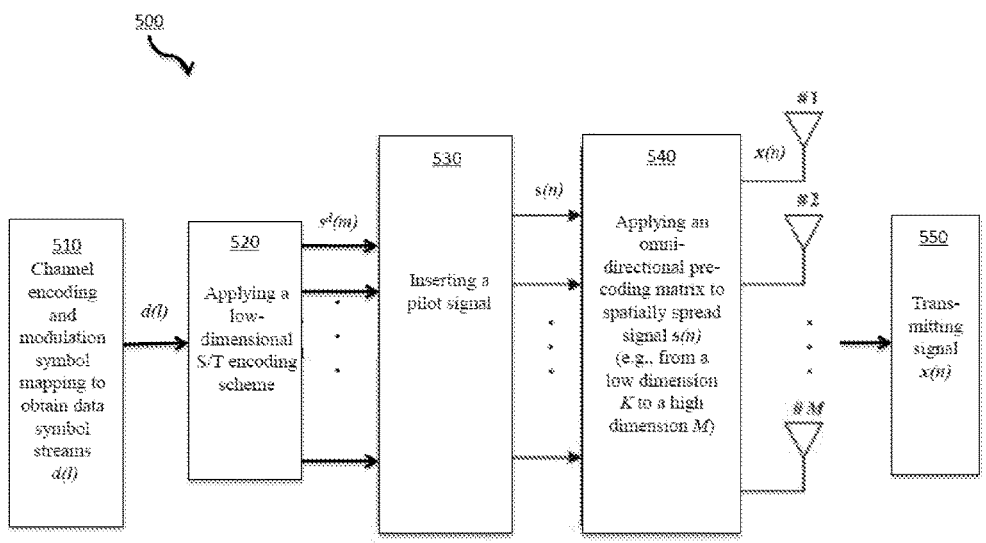
FIG. 5 is a flow diagram presenting part of an exemplary omni-directional transmission scheme on the base station side in a massive MIMO system in which embodiments of the invention can be implemented.

FIG. 5 is a flow diagram presenting part of the omni-directional transmission scheme from the base station perspective in a massive MIMO system. As shown in FIG. 5, on the transmitter side, the transmission process 500 starts at step 510, where one or more information bit streams to be transmitted are processed at the base station to obtain data symbol streams d(l). At step 520, a low-dimensional space-time (S/T) coding scheme is applied to the data symbol streams to generate a space-time coded signal, denoted as $s^d(m)$. The low-dimensional space-time coding scheme can be chosen from a variety of space-time transmission methods used in conventional MIMO systems, such as space-time block coding (STBC) transmission method, cyclic delay diversity (CDD) transmission method, or diversity-multiplexing tradeoff (DMT) method, and the low dimension, denoted by K, can be as low as 2, 4 or 8, far less than the number of antennas (e.g., M) in the massive MIMO system. As such, the coded signal is a K-dimensional vector signal.

The transmission process 500 then proceeds to step 530 for pilot sequence insertion. Specifically, the coded signal $s^d(m)$ is periodically (in the time domain or frequency domain or both) inserted with a sequence of K-dimensional pilot (vector) signals of length P. The pilot signal is denoted as $s^p(m')$, $m'=0, 1, \ldots, P-1$. As a result of the pilot insertion, a signal s(n), is generated, which is also a K-dimensional vector signal. Next, at step 540, the signal s(n) is spatially spread or expanded using an omni-directional precoding matrix W to obtain an M-dimensional vector signal as the transmit signal $x(n)=Ws(n)$, wherein W is an M×K precoding matrix. At step 550, the M-dimensional signal x(n) is transmitted by the large-scale array of antennas as the digital baseband signal in the specific time and frequency resources for a public channel to users in all spatial directions.

Figure 6:
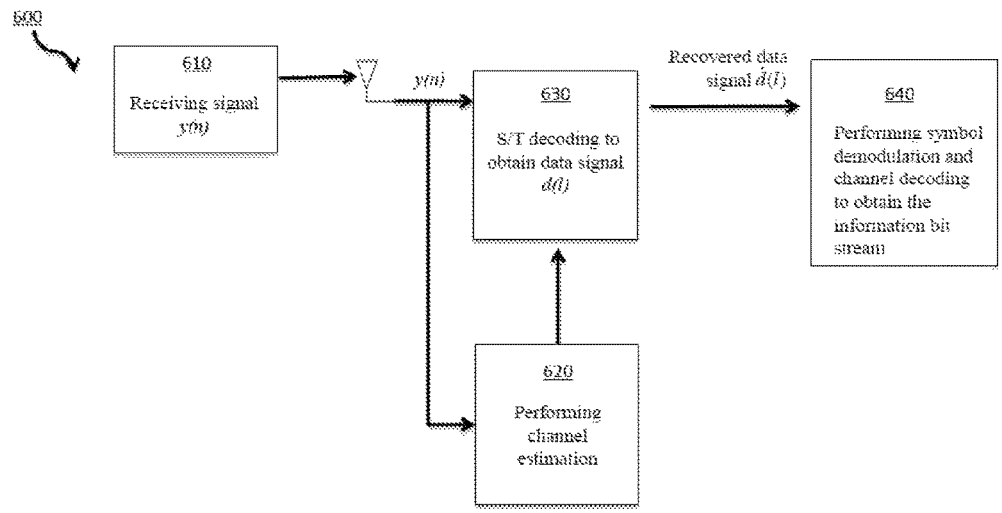
FIG. 6 is a flow diagram presenting part of an exemplary omni-directional transmission scheme on the user side in a massive MIMO system in which embodiments of the invention can be implemented.

FIG. 6 presents a receiving process 600 of the omni-directional transmission scheme according to embodiments of the invention. As shown in FIG. 6, at the receiver end, the process 600 starts at step 610 where the digital baseband signal transmitted over the transmission channels or paths is received by a single receive antenna at the receiver. The received signals, denoted as y(n), include received pilot signals $y^p(m)$, $m'=0, 1, \ldots, P-1$, and received data signals $y^d(m)$, $m=0, 1, \ldots, D-1$. Based on the received pilot signals $y^p(m)$, $m'=0, 1, \ldots, P-1$, channel estimation can be performed to obtain estimated values of the channel parameters at step 620. With the estimated values of channel parameters and the received data signals $y^d(m)$, at step 630, space-time decoding can be performed to recover the original data signal. The recovered data signal 640, denoted as $\hat{d}(l)$, gives the user useful data from the base station.

It should be noted that in wireless transmission systems that adopt channel encoding, the original data signal d(l) is a signal resulting from channel coding, interleaving and modulation symbol mapping of an information bit sequence, and therefore, the recovered data signal $\hat{d}(l)$ needs to go through additional processing, such as de-mapping, de-interleaving and channel decoding, in order to recover the original information bit sequence. These steps are not shown in details in the above processes 500 and 600, but can be incorporated without departing the spirit of the invention.

Also, as will be described below, the above-mentioned channel estimation is actually an estimate of the parameters of an equivalent channel in the precoding space, and the space-time decoding is also performed in the equivalent channel.

Assuming that the channel is approximately invariant over the current resource block, the digital baseband signal y(n) received by the receiver can be expressed by the following equation (1):

$$y(n) = hWs(n) + z(n) \quad (1)$$
$$= \tilde{h}s(n) + z(n)$$

where h represents the channel between the base station and the user, which comprises an M-dimensional channel vector, z(n) represents the Additive White Gaussian Noise (AWGN), and $\tilde{h}=hW$ represents the equivalent channel in the precoding space, which is a K-dimensional channel vector.

If, assuming in any given period of pilot insertion, there are P pilot vector signals and D data vector signals, then the received pilot signals and data signals can be expressed by the following two equations (2) and (3), respectively:

$$y^p(m') = \tilde{h}s^p(m') + z^p(m'), \ m'=0,1,\ldots,P-1 \quad (2)$$

$$y^d(m) = \tilde{h}s^d(m) + z^d(m), \ m=0,1,\ldots,D-1 \quad (3)$$

where $z^p(m')$ and $z^d(m)$ represent the corresponding noise terms. Using these two equations, channel estimation and space-time decoding can be performed at the receive side.

Further, if it is denoted that $$y^p = [y^p(0)\, y^p(1)\, \ldots\, y^p(P-1)]$$
$$S^p = [s^p(0)\, s^p(1)\, \ldots\, s^p(P-1)]$$
$$z^p = [z^p(0)\, z^p(1)\, \ldots\, z^p(P-1)]$$

and assume that the K×P matrix $S^p$, whose columns consisting of pilot signals, satisfies $S^p(S^p)^H = I_K$, where H represents conjugate transpose, $I_K$ is a K×K identity matrix, then the least square estimation (LSE) of equivalent channel $\tilde{h}$ can be obtained from the following equation (4):

$$\hat{\tilde{h}} = y^p(S^p)^H \quad (4)$$

In order to estimate the equivalent channel $\tilde{h}$ at the receiver end, the pilot length P needs to be greater than or equal to K, but it can be far less than M. This means, the increase of M would not affect P and thus would not cause additional pilot overhead. This is clearly advantageous to conventional transmission schemes, which, as aforementioned, would require the pilot length P to be at least M. Compared to existing transmission schemes, the above-described transmission scheme according to embodiments of the invention can reduce the pilot overhead by up to M/K times.

Based on the estimated value of $\tilde{h}$, the above equation (3) for data signal as well as the specific space-time coding method used in the system, the receiver end can obtain the recovered data signal $\hat{d}(l)$. Again, the original data signal d(l) can be a signal resulting from additional processing steps, such as channel coding, interleaving and modulation symbol mapping of an information bit sequence. In that case, the recovered data signal $\hat{d}(l)$ needs to go through additional processing, such as de-mapping, de-interleaving and channel decoding, in order to recover the original information bit sequence. $\hat{d}(l)$ can be obtained as exhibited by the following example.

It should be appreciated that the above-described processes at the transmitter side and receiver side are for illustration only, and many variations or additional steps may be applied without departing the spirit of the invention. Also, all signals in transmission are described in singular form in the above processes, but it should be understood that a plurality of signals can be transmitted in actual implementations.

The benefits of the above-described omni-directional transmission scheme according to embodiments of the invention can be further presented in a specific example as follows:

In this example, the assumptions include: K=2 and the Alamouti space-time block coding method is used for encoding and decoding in the above-described processes. Also, assuming that the length of data signals is D=KB, meaning that in any one given pilot period, there are B space-time code blocks, the transmitting data signal matrix for the b-th block can be denoted by the equation (5) below:

$$S^d(b) = [s^d(2b)\ \ s^d(2b+1)] = \begin{bmatrix} d(2b) & -d^*(2b+1) \\ d(2b+1) & d^*(2b) \end{bmatrix} \quad (5)$$

where b=0, ..., B−1, * represents taking conjugation. The received signal of the b-th block can be denoted as:

$$y^d(b) = [y^d(2b)\, y^d(2b+1)] = \tilde{h}S^d(b) + z^d(b) \quad (6)$$

where $z^d(b) = [z^d(2b)\ z^d(2b+1)]$.

As a result, on the receiver side, the estimated value for the recovered data signal can be calculated from the following equation (7):

$$[\hat{d}(2b)\ \ \hat{d}(2b+1)] = [y^d(2b)\ \ (y^d(2b+1))^*]\begin{bmatrix} \hat{\tilde{h}}_1^* & \hat{\tilde{h}}_2^* \\ \hat{\tilde{h}}_2 & -\hat{\tilde{h}}_1 \end{bmatrix} \quad (7)$$

As seen in the above example, space-time decoding is performed in the K-dimensional equivalent channel vector, which is a 2-dimension channel vector in this case. As a result, the decoding complexity can be significantly reduced.

B. Design and Examples of Omni-directional Precoding Matrix

One key component in the above-described omni-directional transmission scheme is the omni-dimensional precoding matrix W, by which the signal encoding and decoding, especially for pilot signals, can be simplified from a high dimension M to a low dimension K. Thus, how to design such a matrix W properly becomes a determinative factor for the transmission scheme to provide efficient and effective transmission.

In general, to ensure transmission performance, the transmission scheme needs to be so designed as to allow the system to possess the following characteristics in any given cell: (1) The signals transmitted from the base station, in any spatial direction, have the same signal powers, thereby ensuring a full coverage of the cell; (2) The transmitting signals from all antenna units equipped in the base station can have the same signal powers, thereby maximizing the power efficiency of each radio frequency unit and massive arrays of antennas; and (3) The degree of diversity can be as much as that of the low-dimensional space-time coding scheme employed.

In general, it can be assumed that the mean value of all elements in the transmit signal vector s(n) is zero, their covariance is $\sigma_s^2$, and they are independently and identically distributed. Mathematically, this means, E{s(n)}=0, E{s(n)(s(n))^H}=$\sigma_s^2 I_K$, where E{•} represents mean value, 0 represents a vector with all elements to be zero. In this case, the omni-directional precoding matrix W may be designed according to the following criteria:

(1) All M rows of W have the same 2-norm.
(2) All M rows of the matrix that results from W left-multiplying an matrix constructed from the array manifold in discrete spatial directions(e. g. an M-point DFT matrix for the uniform linear antenna array) have the same 2-norm.
(3) All K columns of W have the same 2-norm and are orthogonal to each other.

Without limiting the generality of foregoing, the principles above can be alternatively expressed in the following equations (8)-(10):

$$\text{diag}(WW^H) = \frac{K}{M} 1_M \quad (8)$$

$$\text{diag}(F_M WW^H F_M^H) = \frac{K}{M} 1_M \quad (9)$$

$$W^H W = I_K \quad (10)$$

where diag(A) represents the vector consisting of main diagonal elements of matrix A. $1_M$ represents the M-dimensional vector whose elements are all 1. $F_M$ is a matrix constructed from the array manifold in discrete spatial directions. The array manifold refers to the set $\{v(\theta), 0 \leq \theta \leq 2\pi\}$ where $\theta$ is the spatial direction and $v(\theta)$ is the corresponding array response vector. The matrix $F_M$ can be constructed as $[v(\theta_0) \ v(\theta_1) \ \ldots \ v(\theta_{M-1})]^H$, where $\theta_m$, $0 \leq m \leq M-1$, are the M discrete samplings in $[0, 2\pi]$. When the basestation is equipped with an uniform linear antenna array, $F_M$ is the M-point DFT matrix, whose (m, n)th element is given by $$[F_M]_{m,n} = \frac{1}{\sqrt{M}} e^{-j2\pi mn/M}.$$

Notably, any matrix W that meets the above design principles may have a few alternative or derivative matrices that can also be used in the omni-directional transmission scheme. For example, in the case of uniform linear antenna array, if W is left multiplied by an M-point DFT matrix, or left-multiplied by an inverse DFT matrix, or right-multiplied by any unitary matrix U, the resulting matrices $F_M W$, $F_M^H W$ and WU can be used as an omni-directional precoding matrix in the transmission scheme described herein.

Below are three design examples of an omni-directional precoding matrix W according to the above equations (8), (9) and (10) for the case with an uniform linear antenna array.

EXAMPLE 1

Different columns of the precoding matrix W can be obtained by applying different linear modulation schemes to a Constant Amplitude Zero Auto Correlation (CAZAC) sequence, and the K modulation sequences are chosen from any K columns of the M-point DFT matrix. W can be denoted in the following equation (11):

$$W = \frac{1}{\sqrt{M}} \quad (11)$$

$$\text{diag}(a) \begin{bmatrix} e^{-j2\pi l_0 \cdot 0/M} & e^{-j2\pi l_1 \cdot 0/M} & \cdots & e^{-j2\pi l_{K-1} \cdot 0/M} \\ e^{-j2\pi l_0 \cdot 1/M} & e^{-j2\pi l_1 \cdot 1/M} & \cdots & e^{-j2\pi l_{K-1} \cdot 1/M} \\ \vdots & \vdots & \ddots & \vdots \\ e^{-j2\pi l_0 \cdot (M-1)/M} & e^{-j2\pi l_1 \cdot (M-1)/M} & \cdots & e^{-j2\pi l_{K-1} \cdot (M-1)/M} \end{bmatrix}$$

where a is a CAZAC sequence of length M, e.g., a Zadoff-Chu sequence, such that the modulus of each element is 1 and is orthogonal to the cyclic shift of itself. diag(a) represents the diagonal matrix whose diagonal elements comprising the vector a. $l_k$ is an integer, $0 \leq l_k \leq M-1$, and when $m \neq k$, $l_m \neq l_k$.

Or briefly, W can be denoted as follows:

$$W = \text{diag}(a) F_M \Gamma \quad (12)$$

where $\Gamma$ is a M×K matrix satisfying $\Gamma^H \Gamma = I_K$, and each column of $\Gamma$ has one and only one non-zero element.

EXAMPLE 2

Different columns of the omni-directional precoding matrix W can be obtained by different cyclic shifts to the same CAZAC sequence, described as:

$$W = \frac{1}{\sqrt{M}} \left[ \prod_M^{l_0} a \quad \prod_M^{l_1} a \quad \cdots \quad \prod_M^{l_{K-1}} a \right] \quad (13)$$

where a is a CAZAC sequence of length M, e.g., a Zadoff-Chu sequence, such that the modulus of each element is 1 and is orthogonal to the cyclic shift of itself. $l_k$ is an integer, $0 \leq l_k \leq M-1$, and when $m \neq k$, $l_m \neq l_k$. $\Pi_M^l$ is an M×M permutation matrix, defined as $$\prod_M^l = \begin{bmatrix} 0 & I_l \\ I_{M-l} & 0 \end{bmatrix}.$$

Or briefly, W can be represented as follows:

$$W = \frac{1}{\sqrt{M}} \text{circ}(a) \Gamma \quad (14)$$

where circ(a) is an M×M circular matrix whose l-th column is $\Pi_M^l a$. $\Gamma$ is an M×K matrix satisfying $\Gamma^H \Gamma = I_K$, and each column of $\Gamma$ has one and only one non-zero element.

EXAMPLE 3

Different columns of the omni-directional precoding matrix W can be obtained by longitudinally copying a K×K identity matrix M/K times and then multiplying a diagonal matrix consisting of a CAZAC sequence:

$$W = \sqrt{\frac{K}{M}} \text{diag}(a)(1_{M/K} \otimes I_K) \quad (15)$$

where a is a CAZAC sequence of length M, diag(a) represents the diagonal matrix whose diagonal elements comprising the vector a, $1_{M/K}$ is column vector whose elements are all 1, $\otimes$ represents the Kronecker product.

Figure 7:
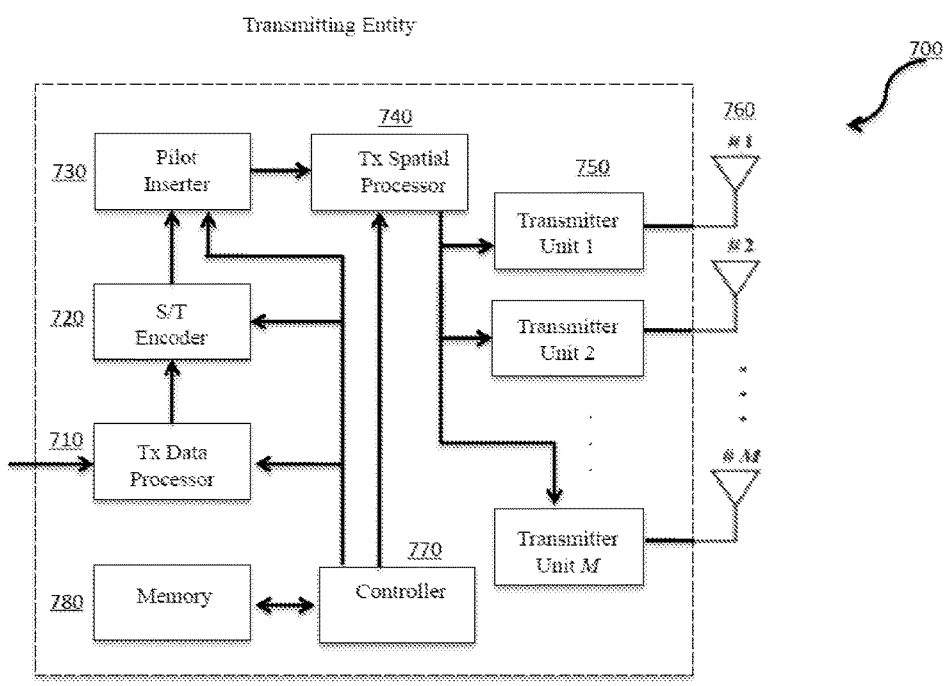
FIG. 7 is a simplified functional block diagram of an exemplary transmitting entity in which embodiments of the invention can be implemented.

FIG. 7 is a simplified functional block diagram of an exemplary transmitting entity or base station in which embodiments of the invention can be implemented. As shown in FIG. 7, the transmitting entity 700 comprises, among other components (not shown), at least a transmit (Tx) data processor 710, a S/T encoder 720, a pilot inserter 730, a Tx spatial processor 740, multiple transmitter units 750 connected to a number of antenna units 760, a controller 770 and a memory unit 780.

In operation, the Tx data processor 710 receives and processes (e.g., encodes, interleaves, and modulates) information bit stream to generate data symbol streams. According to the omni-directional transmission scheme described herein, the S/T encoder 720 applies a low-dimensional S/T encoding scheme to the symbol streams, followed by a pilot insertion performed in the pilot inserter 730. Then, the Tx spatial processor 740 receives and spatially processes the resulting signal by use of an omni-directional precoding matrix W to generate M-dimensional transmit signal for transmitter units 750, e.g., Transmitter Unit 1, Transmitter Unit 2 . . . Transmitter Unit M. Each transmitter unit 750 conditions (e.g., OFDM modulates, converts to analog, filters, amplifies, and frequency converts) a respective transmit signal to generate a modulated signal for transmission through antenna units 760. In the case of a base station used for massive MIMO, the total number of antenna units can be of hundreds, e.g., M=128. The controller 770 is configured to control the operation of various processing units at the transmitting entity 700. The controller 770 has access to the memory unit 780 that stores data and/or program codes to be executed by the controller.

It should be understood that the transmit entity 700 in FIG. 7 is simplified for illustration only, and many variations and additions can be included in actual implementations.

Figure 8:
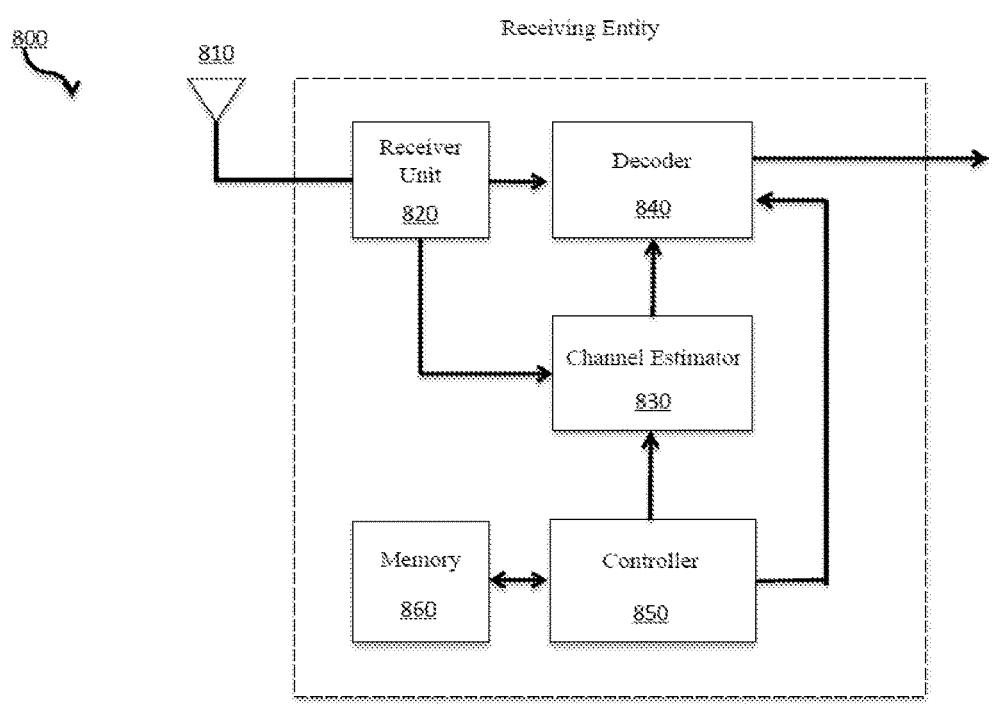
FIG. 8 is a simplified functional block diagram of an exemplary receiving entity in which embodiments of the invention can be implemented.

FIG. 8 is a simplified functional block diagram of an exemplary receiving entity or user terminal in which embodiments of the invention can be implemented. As shown in FIG. 8, the receiving entity 800 comprises a single antenna 810 coupled to a receiver unit 820, a channel estimator 830, a decoder 840, a controller 850 and a memory unit 860.

In operation, the antenna 810 receives signals from the base station over the transmission channels and provides a received signal to the receiver unit 820. The receiver unit 820 is configured to perform processing complementary to the processing performed by the transmitter unit in a transmitting entity, such as the transmitter unit 750 in FIG. 7, thereby providing received data signals to the decoder 840 and received pilot signals to the channel estimator 830. With estimated channel information from the channel estimator 830, the decoder 840 is able to decode the received data symbols and recover the original bit stream. The controller 850 is configured to control the operation of various processing units at the receiving entity 800. The controller 850 has access to the memory unit 860 that stores data and/or program codes to be executed by the controller.

It should be understood that the receive entity 800 in FIG. 8 is simplified for illustration only, and many variations and additions can be included in actual implementations. For example, multiple antennas may be implemented in the receiving entity, and in that case, a Rx spatial processor may be included to perform spatial processing of received signals from multiple receiver units connected to the multiple antennas.

While various embodiments of the invention have been described above, it should be understood that they have been presented by way of example only, and not by way of limitation. Likewise, the various diagrams may depict an example architectural or other configuration for the disclosure, which is done to aid in understanding the features and functionality that can be included in the disclosure. The disclosure is not restricted to the illustrated example architectures or configurations, but can be implemented using a variety of alternative architectures and configurations. Additionally, although the disclosure is described above in terms of various exemplary embodiments and implementations, it should be understood that the various features and functionality described in one or more of the individual embodiments are not limited in their applicability to the particular embodiment with which they are described. They instead can be applied alone or in some combination, to one or more of the other embodiments of the disclosure, whether or not such embodiments are described, and whether or not such features are presented as being a part of a described embodiment. Thus the breadth and scope of the present disclosure should not be limited by any of the above-described exemplary embodiments.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known", and terms of similar meaning, should not be construed as limiting the item described to a given time period, or to an item available as of a given time. But instead these terms should be read to encompass conventional, traditional, normal, or standard technologies that may be available, known now, or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to", or other like phrases in some instances shall not be read to mean that the narrower case is intended or required in instances where such broadening phrases may be absent.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only to be seen as references to suitable means for providing the described functionality, rather than indicative of a strict logical or physical structure or organization.

Furthermore, although individually listed, a plurality of means, elements or method steps may be implemented by, for example, a single unit or processing logic element. Additionally, although individual features may be included in different claims, these may possibly be advantageously combined. The inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A method for omni-directional transmissions in large scale MIMO systems, comprising:
    generating one or more K-dimensional vector signals, said K-dimensional vector signal including at least a K-dimensional data signal and a K-dimensional pilot signal, wherein said K-dimensional data signal is generated by using a space-time coding scheme;
    applying an omni-directional pre-coding matrix W to said one or more K-dimensional vector signals to generate one or more M-dimensional vector signals, wherein M rows of said omni-directional pre-coding matrix W have the same 2-norm, and K is much smaller than M; and
    transmitting said M-dimensional vector signals over M transmitting antennas in a base station of said large scale MIMO system.

2. The method of claim 1, further comprising:
    said K-dimensional vector signals including at least a sequence of K-dimensional pilot signals of length P, wherein P≥K.

3. The method of claim 1, further comprising processing a data stream to generate one or more symbol streams, wherein said symbol streams are encoded with said space-time encoding scheme to generate said K-dimensional data signal.

4. The method of claim 1, wherein all K columns of the said matrix W have the same 2-norm and are orthogonal to each other.

5. The method of claim 1, wherein when said pre-coding matrix W is left-multiplied by an matrix constructed from the array manifold in discrete spatial directions to generate a different matrix, all rows of said different matrix have the same 2-norm.

6. The method of claim 5, wherein said matrix constructed from the array manifold in discrete spatial directions can be an M-point DFT matrix for the linear antenna array.

7. The method of claim 4, wherein when said pre-coding matrix W is left-multiplied by an matrix constructed from the array manifold in discrete spatial directions to generate a different matrix, all rows of said different matrix have the same 2-norm.

8. The method of claim 7, wherein said matrix constructed from the array manifold in discrete spatial directions can be an M-point DFT matrix for the linear antenna array.

9. The method of claim 1, wherein the number of transmit antennas equipped in said base station is M, wherein M is of or over the level of tens.

10. The method of claim 1, wherein said omni-dimensional precoding matrix W is generated by applying different linear modulation schemes to a Constant Amplitude Zero Auto Correlation(CAZAC) sequence, and choosing K number of modulation sequences from any K columns of the M-point DFT matrix.

11. The method of claim 1, wherein said omni-directional precoding matrix W is generated by performing different cyclic shifts to one CAZAC sequence to obtain K columns of said matrix W.

12. The method of claim 1, wherein said omni-directional precoding matrix W is generated by longitudinally copying a K×K identity matrix M/K times and multiplying a diagonal matrix consisted of a CAZAC sequence to obtain K columns of said matrix W.

13. The method of claim 1, wherein signals transmitted from said base station in all spatial directions have the same signal power.

14. The method of claim 13, wherein signals transmitted from all antenna units equipped in said base station have the same transmission power.

15. The method of claim 14, wherein said space-time coding scheme provides a first degree of diversity, said method providing a second degree of diversity that is as much as said first degree of diversity.

16. The method of claim 1, wherein said M-dimensional vector signal is transmitted to multiple users in said system, each user receiving a signal comprising a data signal and a pilot signal, and wherein said data signal is decoded at a K-dimensional equivalent channel to recover original data from said base station.

17. A method for data transmission in a wireless communication system, said method comprising:
    receiving a downlink signal at a mobile terminal, said downlink signal resulting from an M-dimensional vector signal transmitted from a base station;
    wherein said M-dimensional vector signal is generated using an omni-directional pre-coding matrix W applied to K-dimensional vector signal, M rows of the omni-directional pre-coding matrix W having the same 2-norm;
    wherein said K-dimensional vector signal including at least a K-dimensional data signal and a K-dimensional pilot signal;
    wherein K is much smaller than M; and
    wherein said K-dimensional data signal is generated by a space-time coding scheme, and decoding said downlink signal based on said space-time coding scheme.

18. The method of claim 17, said method further comprising:
    separating said downlink signal into received data signal and received pilot signal;
    performing channel estimation based on said received pilot signal; and
    decoding said received data signal based on said space-time coding scheme and said channel estimation to recover original data streams sent from said base station.

19. A transmitting device comprising:

M transmitting antennas;

a spatial processor coupled to said transmitting antennas, said spatial processor configured to spatially process a K-dimensional vector signal by using an omni-directional pre-coding matrix W and generate an M-dimensional vector signal for transmission over said M transmitting antennas;

wherein said omni-directional pre-coding matrix W comprises M rows and K column, and M rows of said omni-directional pre-coding matrix W have the same 2-norm; and K is much smaller than M.

* * * * *